US009978374B2

United States Patent

(12) United States Patent
Heigold et al.

(10) Patent No.: US 9,978,374 B2
(45) Date of Patent: May 22, 2018

(54) NEURAL NETWORKS FOR SPEAKER VERIFICATION

(71) Applicant: Google LLC, Mountain View, CA (US)

(72) Inventors: Georg Heigold, Mountain View, CA (US); Samy Bengio, Los Altos, CA (US); Ignacio Lopez Moreno, New York, NY (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 14/846,187

(22) Filed: Sep. 4, 2015

(65) Prior Publication Data

US 2017/0069327 A1 Mar. 9, 2017

(51) Int. Cl.

*G10L 17/18* (2013.01)
*G10L 17/04* (2013.01)
*G10L 17/02* (2013.01)

(52) U.S. Cl.

CPC .............. *G10L 17/18* (2013.01); *G10L 17/02* (2013.01); *G10L 17/04* (2013.01)

(58) Field of Classification Search

CPC ........................................................ G10L 17/04
See application file for complete search history.

(56) References Cited

U.S. PATENT DOCUMENTS

| | | | |
|---|---|---|---|
| 8,812,320 B1 * | 8/2014 | Roblek | G10L 17/24 704/246 |
| 2014/0214417 A1 * | 7/2014 | Wang | G10L 17/18 704/232 |
| 2015/0127336 A1 | 5/2015 | Lei et al. | |

OTHER PUBLICATIONS

Auckenthaler et al., "Score normalization for text-independent speaker verification systems," Digital Signal Processing, vol. 10, No. 1-3, pp. 42-54, 2000.

Wang, "Text-dependent speaker verification using recurrent time delay neural networks for feature extraction," in Neural Networks for Processing [1993] III. Proceedings of the 1993 IEEE-SP Workshop, Sep. 1993, pp. 353-361.

Heigold et al., End-to-End Text-Dependent Speaker Verification, IEEE International Conference on Acoustics, Speech and Signal Processing (ICASSP), IEEE, 2016, 5 pages.

International Search Report and Written Opinion in International Application No. PCT/US2016/044181, dated Oct. 19, 2016.

(Continued)

*Primary Examiner* — Qian Yang
(74) *Attorney, Agent, or Firm* — Fish & Richardson P.C.

(57) ABSTRACT

This document generally describes systems, methods, devices, and other techniques related to speaker verification, including (i) training a neural network for a speaker verification model, (ii) enrolling users at a client device, and (iii) verifying identities of users based on characteristics of the users' voices. Some implementations include a computer-implemented method. The method can include receiving, at a computing device, data that characterizes an utterance of a user of the computing device. A speaker representation can be generated, at the computing device, for the utterance using a neural network on the computing device. The neural network can be trained based on a plurality of training samples that each: (i) include data that characterizes a first utterance and data that characterizes one or more second utterances, and (ii) are labeled as a matching speakers sample or a non-matching speakers sample.

17 Claims, 7 Drawing Sheets

(56) References Cited

OTHER PUBLICATIONS

Amadeo, "My voice is my passport: Android gets a "Trusted Voice" smart lock," Ars Technica, Apr. 13, 2015 [retrieved on Sep. 4, 2015]. Retrieved from the Internet: URL<http://arstechnica.com/gadgets/2015/04/my-voice-is-my-passport-android-gets-a-trusted-voice-smart-lock/>, 4 pages.
Aronowitz, "Text-dependent speaker verification using a small development set," in Proc. Odyssey Speaker and Language Recognition Workshop, Singapore, Jun. 2012, 27 pages.
Burget et al., "Discriminatively trained probabilistic linear discriminant analysis for speaker verification," in IEEE International Conference on Acoustics, Speech, and Signal Processing (ICASSP), pp. 4832-4835, May 2011.
Campbell et al., "Forensic speaker recognition," IEEE Signal Processing Magazine, 26(2):95-103, Mar. 2009.
Dean et al., "Large scale distributed deep networks," in Advances in Neural Information Processing Systems (NIPS), 2012, pp. 1232-1240.
Dehak et al., "Front-end factor analysis for speaker verification," IEEE Transactions on Audio, Speech, and Language Processing, vol. 19, pp. 788-798, 2011.
Fazel and Chakrabartty, "An overview of statistical pattern recognition techniques for speaker verification," IEEE Circuits and Systems Magazine 11(2):62-81, Jun. 2011.
Gonzalez-Dominguez et al., "Automatic language identification using long short-term memory recurrent neutral networks," in Interspeech, Singapore, Sep. 2014, pp. 2155-2159.
Graves and Jaitly, "Towards End-to-End Speech Recognition with Recurrent Neural Networks," Proceedings of the 31st International Conference on Machine Learning, vol. 32, 2014, pp. 1764-1772.
Greenberg et al., "The NIST 2014 speaker recognition i-vector machine learning challenge," in Odyssey 2014: The Speaker and Language Recognition Workshop, Joensuu, Finland, pp. 224-230, Jun. 2014.
Hershey et al., "Deep unfolding: Model-based inspiration of novel deep architectures," CoRR, vol. abs/1409.2574, Nov. 2014. [Online]. Available: http://arxiv.org/abs/1409.2574, pp. 1-27.
Hinton et al., "Improving neural networks by preventing co-adaptation of feature detectors," CoRR, vol. abs/1207.0580, Jul. 2012. [Online]. Available: http://arxiv.org/abs/1207.0580, pp. 1-18.
Hochreiter and Schmidhuber, "Long short-term memory," Neural Computation, vol. 9, No. 8, pp. 1735-1780, 1997.
Jean et al., "On using very large target vocabulary for neural machine translation," CoRR, vol. abs/1412.2007, Dec. 2014. [Online]. Available: http://arxiv.org/abs/1412.2007, 10 pages.
Kenny et al. "Joint factor analysis versus eigenchannels in speaker recognition," IEEE Transactions on Audio, Speech, and Language Processing, vol. 15, pp. 1435-1447, 2007.
Kenny, "Bayesian speaker verification with heavy-tailed priors," in Proc. Odyssey Speaker and Language Recognition Workshop, Brno, Czech Republic, Jul. 2010, 10 pages.
Larcher et al., "Phonetically-constrained PLDA modeling for text-dependent speaker verification with multiple short utterances," in IEEE International Conference on Acoustics, Speech, and Signal Processing (ICASSP), Vancouver, Canada, May 2013, pp. 7673-7677.
LeCun et al., "Gradient-based learning applied to document recognition," Proceedings of the IEEE, vol. 86, No. 11, pp. 2278-2324, 1998.
Lei et al., "A Novel Scheme for Speaker Recognition Using a Phonetically-Aware Deep Neural Network," 2014 IEEE International Conference on Acoustics, Speech and Signal Processing (ICASSP), May 2014, pp. 1695-1699.
Mairal et al., "Task-driven dictionary learning," IEEE Transactions on Pattern Analysis and Machine Intelligence, vol. 34, No. 4, pp. 791-804, 2012.
Parveen et al., "Speaker recognition with recurrent neural networks," in Sixth International Conference on Spoken Language Processing, ICSLP 2000 / INTERSPEECH 2000, Beijing, China, Oct. 2000, pp. 16-20.
Prabhavalkar et al., "Automatic gain control and multi-style training for robust small-footprint keyword spotting with deep neural networks," in IEEE International Conference on Acoustics, Speech, and Signal Processing (ICASSP), Brisbane, Australia, Apr. 2015, pp. 4704-4708.
Ravenscraft, "Google Starts Rolling Out 'Trusted Voice' Smart Lock Option," Life Hacker, Apr. 13, 2015 [retrieved on Sep. 4, 2015]. Retrieved from the Internet: URL<http://lifehaeker.com/google-starts-rolling-out-trusted-voice-smart-lock-opti-1697437287>, 5 pages.
Reynolds et al., "Speaker verification using adapted Gaussian mixture models," Digital Signal Processing, 10(1):19-41, 2000.
Richardson et al., "A Unified Deep Neural Network for Speaker and Language Recognition," arXiv:1504.00923v1 [cs.CL], Apr. 2015, 5 pages.
Sak et al., "Long short-term memory recurrent neural network architectures for large scale acoustic modeling," in Interspeech, Singapore, Sep. 2014, pp. 338-342.
Schroff et al., "FaceNet: A unified embedding for face recognition and clustering," arXiv:1503.03832v3 [cs.CV], Jun. 2015, 10 pages.
Stafylakis et al., "Text-dependent speaker recognition using PLDA with uncertainty propagation," in Interspeech, Lyon, France, Aug. 2013, 5 pages.
Variani et al., "Deep neural networks for small footprint text-dependent speaker verification," in IEEE International Conference on Acoustics, Speech, and Signal Processing (ICASSP), Florence, Italy, May 2014, pp. 4080-4084.
Vieira et al., "Speaker Verification for Security Systems Using Artificial Neural Networks," Industrial Electronics, Control and Instrumentation, 1997. IECON 97. 23rd International Conference on, vol. 3, Nov. 1997, pp. 1102-1107.
Wikipedia, "Deep learning," Jul. 14, 2015 [retrieved on Jul. 16, 2015]. Retrieved from the Internet: URL<https://en.wikipedia.org/wiki/Deep_learning>, 14 pages.
Zaino, "Google Researchers Use End-to-End Neural Network to Caption Pictures," Dataversity [online], Nov. 18, 2014 [retrieved on Jul. 16, 2015]. Retrieved from the Internet: URL<http://www.dataversity.net/google-researchers-use-end-end-neural-network-caption-pictures/>, 7 pages.
'en.wikipedia.org' [online] "Backpropagation," Last Updated on: Jun. 9, 2017, [retrieved on Jun. 16, 2017] Retrieved from Internet URL< https://en.wikipedia.org/wiki/Backpropagation> 14 pages.
'en.wilcipedia.org' [online] "k-means clustering," Last Updated on: May 30, 2017, [retrieved on Jun. 16, 2017] Retrieved from Internet URL< https://en.wikipedia.org/wiki/K-means_clustering> 8 pages.
'www.mathworks.com' [online] "Neural Network Training Concepts," 2017, [retrieved on Jun. 16, 2017] Retrieved from Internet URL< https://www.mathworks.com/help/nnet/ug/neural-network-training-concepts.html?requestedDomain=www.mathworks.com &requestedDomain=www.mathworks.com> 6 pages.
Ge et al. "Neural Network Based Speaker Classification and Verification Systems with Enhances Features," arXiv preprint arXiv 1702.02289v1, Feb. 8, 2017, 6 pages.
Islam et al. "A Novel Approach for Text-Independent Speaker Identification Using Artificial Neural Network," International Journal of Innovative Research in Computer and Communication Engineering 1(4), Jun. 2013, 7 pages.
Litinskii et al. "Neural Network Clustering Based on Distances Between Objects," Artificial Neural Networks—ICANN 2006, 2006, 7 pages.
Love et al. "Automatic Speaker Recognition Using Neural Networks," Submitted to Dr. Joydeep Ghosh for EE371D Intro. To Neural Networks, Electrical and Computer Engineering Department, University of Texas, Austin, Spring 2004, 25 pages.
Lukic et al. "Speaker Identification and Clustering Using Convolutional Neural Networks," IEEE International Workshop on Machine Learning for Signal Processing, Sep. 13-16, 2016, 6 pages.

(56) References Cited

OTHER PUBLICATIONS

Nair et al. "Efficient Speaker Identification Using Artificial Neural Network," IJECT 6(1) Jan.-Mar. 2015, ISSN 2230-7109 (online), 4 pages.
Nossair et al. "A Neural Network Clustering Technique for Text-Independent Speaker Identification," Proceedings of ANNIE Conference, Nov. 13-16, 1994, 9 pages.
Richardson et al. "Deep Neural Network Approaches to Speaker and Language Recognition," IEEE Signal Processing Letters, 22(10) Oct. 2015, 5 pages.
Variani et al. "Deep Neural Networks for Small Footprint Text-Dependent Speaker Verification," IEEE International Conference on Acoustic, Speech and Signal Processing, May 4-9, 2014, 5 pages.
Sainath. "Towards End-to-End Speech Recognition Using Deep Neural Networks," PowerPoint presentation, Deep Learning Workshop, ICML, Jul. 10, 2015, 51 pages.

* cited by examiner

NEURAL NETWORKS FOR SPEAKER VERIFICATION

TECHNICAL FIELD

The subject matter of this document generally relates to neural networks and other models employed in speaker verification tasks.

BACKGROUND

Speaker verification generally relates to verifying the identity of a person based on characteristics of the person's voice. Some computing devices allow a user to "enroll" with the device by providing to the device one or more samples of speech spoken by the user, from which a speaker model representing the user's voice is determined. Subsequent speech samples received at the device may then be processed and evaluated with respect to the speaker model to verify a user's identity.

SUMMARY

This document generally describes systems, methods, devices, and other techniques for training and using neural networks, or other types of models, for speaker verification. In some implementations, the neural network may be a component of a speaker verification model that is accessible by a computing device performing speaker verification. Generally, the neural network may be trained in iterations that each simulate speaker enrollment and verification of an utterance. For example, in each training iteration, a speaker representation generated by the neural network for a given utterance may be evaluated with respect to a speaker model. Based on a comparison of the speaker representation for a simulated verification utterance to a combination (e.g., average) of speaker representations for one or more simulated enrollment utterances, the parameters of the neural network may be updated so as to optimize the ability of the speaker verification model to classify a given utterance as having been spoken by the same person or by a different person than an enrolled person. The neural network may be further configured to process data characterizing an entire utterance in a single pass through the neural network, rather than processing frames of the utterance individually or sequentially. These and other implementations are described more fully below, and depicted in the Figures.

Some implementations of the subject matter described herein include a computer-implemented method. The method can include selecting, at a computing system, multiple different subsets of training data for training a neural network. Each subset of training data can include a plurality of first components that characterize respective utterances of a first speaker and a second component that characterizes an utterance of the first speaker or a second speaker. For each of the selected subsets of training data, the method can include: inputting each of the first components into the neural network to generate a respective first speaker representation corresponding to each of the first components; inputting the second component into the neural network to generate a second speaker representation corresponding to the second component; determining a simulated speaker model for the first speaker based on an average of the respective first speaker representations for the plurality of first components; comparing the second speaker representation with the simulated speaker model to classify the utterance characterized by the second component as an utterance of the first speaker or as an utterance of a speaker other than the first speaker; and adjusting the neural network based on whether the utterance characterized by the second component was correctly classified as an utterance of the first speaker or as an utterance of a speaker other than the first speaker.

These and other implementations can include one or more of the following features.

In response to inputting the second component into the neural network, the second speaker representation can be generated with the neural network by processing, in a single pass through the neural network, data for an entirety of the utterance characterized by the second component.

Selecting a first subset of training data among the multiple different subsets of training data can include: selecting a first group of utterances that corresponds to the first speaker from a plurality of groups of utterances that respectively correspond to different speakers such that each group of utterances consists of data characterizing only utterances of the corresponding speaker for the respective group of utterances; selecting a second group of utterances corresponding to the first speaker or the second speaker from the plurality of groups of utterances; determining the plurality of first components from the data that characterizes utterances in the first group of utterances; and determining the second component from the data that characterizes utterances in the second group of utterances.

At least one of the first group of utterances and the second group of utterances can be selected randomly from the plurality of groups of utterances.

The first speakers can be different from each other among at least some of the multiple different subsets of training data. The second speakers can be different from each other among at least some of the multiple different subsets of training data.

A total number of first components in a first subset of training data among the multiple different subsets of training data can be different than a total number of first components in a second subset of training data among the multiple different subsets of training data.

Comparing the second speaker representation with the simulated speaker model to classify the utterance characterized by the second component as an utterance of the first speaker or as an utterance of a speaker other than the first speaker can include determining a distance between values from the second speaker representation and values from the simulated speaker model, and applying a logistic regression function to the distance.

The neural network can include a plurality of hidden layers. The neural network may not have a softmax output layer.

The neural network can include a deep neural network having a locally-connected hidden layer followed by a plurality of fully-connected hidden layers.

The utterances characterized by the plurality of first components, and the utterance characterized by the second component can all have a fixed length.

The neural network can be a long-short-term memory recurrent neural network that is configured to be trained on data that characterizes utterances having variable lengths.

The utterances characterized by the respective pluralities of first components across the multiple different subsets of training data, and the utterances characterized by the respective second components across the multiple different subsets of training data, can all be utterances of a same word or phrase.

At least some of the utterances characterized by the respective pluralities of first components across the multiple different subsets of training data, and at least some of the utterances characterized by the respective second components across the multiple different subsets of training data, can be utterances of different words or different phrases.

The trained neural network can be provided to one or more computing devices separate from the computing system for use in performing speaker verification on the one or more computing devices.

Each of the first speaker representations can be generated by the neural network based on the respective first component that was inputted into the neural network corresponding to the first speaker representation. The second speaker representation can be generated by the neural network based on the second component that was inputted into the neural network corresponding to the second speaker representation.

Some implementations of the subject matter described herein can include a computing device. The computing device can include one or more computer processors and one or more computer-readable media having instructions stored thereon that, when executed by the one or more processors, cause performance of operations. The operations can include receiving, at the computing device, data that characterizes an utterance of a user of the computing device; generating, at the computing device, a speaker representation for the utterance using a neural network on the computing device, wherein the neural network has been trained based on a plurality of training samples that each: (i) include data that characterizes a first utterance and data that characterizes one or more second utterances, and (ii) are labeled as a matching sample or a non-matching sample according to whether a speaker of the first utterance is the same as a speaker of the one or more second utterances; accessing, at the computing device, a speaker model for an authorized user of the computing device; and evaluating, at the computing device, the speaker representation for the utterance with respect to the speaker model to determine whether the utterance was likely spoken by the authorized user of the computing device.

Each of the plurality of training samples can be generated by selecting the first utterance and the one or more second utterances from groups of utterances that correspond to different speakers, such that each group of utterances consists only of utterances of the corresponding speaker for the respective group of utterances.

The operations can further include obtaining a set of utterances of the authorized user of the computing device; inputting each utterance from the set of utterances into the neural network to generate a respective speaker representation for the utterance; and generating the speaker model for the authorized user of the computing device based on an average of the respective speaker representations for the utterances in the set of utterances of the authorized user.

None of the plurality of training samples on which the neural network has been trained may include data that characterizes the utterance of the user of the computing device.

Generating, at the computing device, the speaker representation for the utterance can include processing data that characterizes an entirety of the utterance with the neural network in a single pass through the neural network.

The neural network can be a recurrent neural network. The utterance of the user can have a first temporal length. The speaker representation for the utterance can include processing data that characterizes the utterance over an entirety of the first temporal length of the utterance. The operations can further include receiving another utterance of the user of the computing device, the other utterance having a second temporal length that is different than the first temporal length; and generating a second speaker representation for the other utterance of the user by processing data that characterizes the other utterance over an entirety of the second temporal length of the other utterance.

The operations can further include performing a function on the computing device in response to determining that the utterance of the user was likely spoken by the authorized user of the computing device. The function can include changing a state of the computing device from a locked state to an unlocked state, wherein the computing device is configured to block access to one or more capabilities of the computing device in the locked stated, wherein the computing device is configured to allow access to the one or more capabilities of the computing device in the unlocked state.

The speaker representation can include an output of the neural network that indicates distinctive features of the user's voice that are determined based on the utterance.

Some implementations of the subject matter described herein can include a computer-implemented method. The method can include receiving, at a computing device, data that characterizes an utterance of a user of the computing device. A speaker representation can be generated, at the computing device, for the utterance using a neural network on the computing device. The neural network can be trained based on a plurality of training samples that each: (i) include data that characterizes a first utterance and data that characterizes one or more second utterances, and (ii) are labeled as a matching sample or a non-matching sample according to whether a speaker of the first utterance is the same as a speaker of the one or more second utterances. A speaker model can be accessed, at the computing device, for an authorized user of the computing device. The speaker representation for the utterance can be evaluated, at the computing device, with respect to the speaker model to determine whether the utterance was likely spoken by the authorized user of the computing device.

Some implementations of the subject matter described herein can include a computer-implemented method. The computer-implemented method can include determining a speaker model for a particular speaker based on outputs of a neural network for a first set of utterances, the first set including multiple different utterances of the particular speaker; determining a speaker representation based on output of the neural network for a particular utterance that is not in the first set of utterances; comparing the speaker representation with the speaker model for the particular speaker to classify the particular utterance as an utterance of the particular speaker or as an utterance of a speaker other than the particular speaker; and adjusting the neural network based on whether the classification of the utterance as an utterance of the particular speaker or as an utterance of a speaker other than the particular speaker was correct.

These and other implementations can include one or more of the following features. Multiple different sets of utterances can be selected as training data for training the neural network. Each set of utterances can include (i) multiple different first utterances of a first speaker for the respective set of utterances, and (ii) a second utterance of either the first speaker for the respective set of utterances or a second speaker for the respective set of utterances other than the first speaker. The multiple different sets of utterances can be used to iteratively train the neural network. Each set of utterances from the multiple different sets of utterances can be used in a different training iteration for training the neural network. The first set of utterances can be selected from the multiple different sets of utterances, wherein the particular speaker is the first speaker for the first set of utterances.

Further implementations of the subject matter described herein can include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by one or more data processing apparatuses, cause the apparatuses to perform the actions.

Some implementations of the subject matter described herein may realize none, one, or more of the following advantages. A neural network can be trained to generate speaker representations for use in a speaker verification model that is capable of more accurately verifying a speaker's identity based on characteristics of the user's voice. Target performance levels may be achieved with a compact neural network that can be stored and used on a mobile computing device having limited computing resources. Additionally, the neural network may be trained in a manner that simulates verification and enrollment phases of a speaker verification process. As such, the neural network may achieve better performance due the symmetry between the training phase and the verification and enrollment phases of the speaker verification process. One benefit of training a neural network according to the approaches described herein, in contrast to other approaches that involve training a neural network to classify inputs as belonging to a particular speaker among a number of pre-selected speakers, is that a greater number and variety of speakers may be used to train the network. Additionally, there may be no minimum number of training utterances required for each training speaker to ensure reliable training. Moreover, the neural network may be configured to process data characterizing entire utterances in a single pass through the neural network, without a need to process frames of the utterance through the neural network in individual passes.

DETAILED DESCRIPTION

Figure 1:
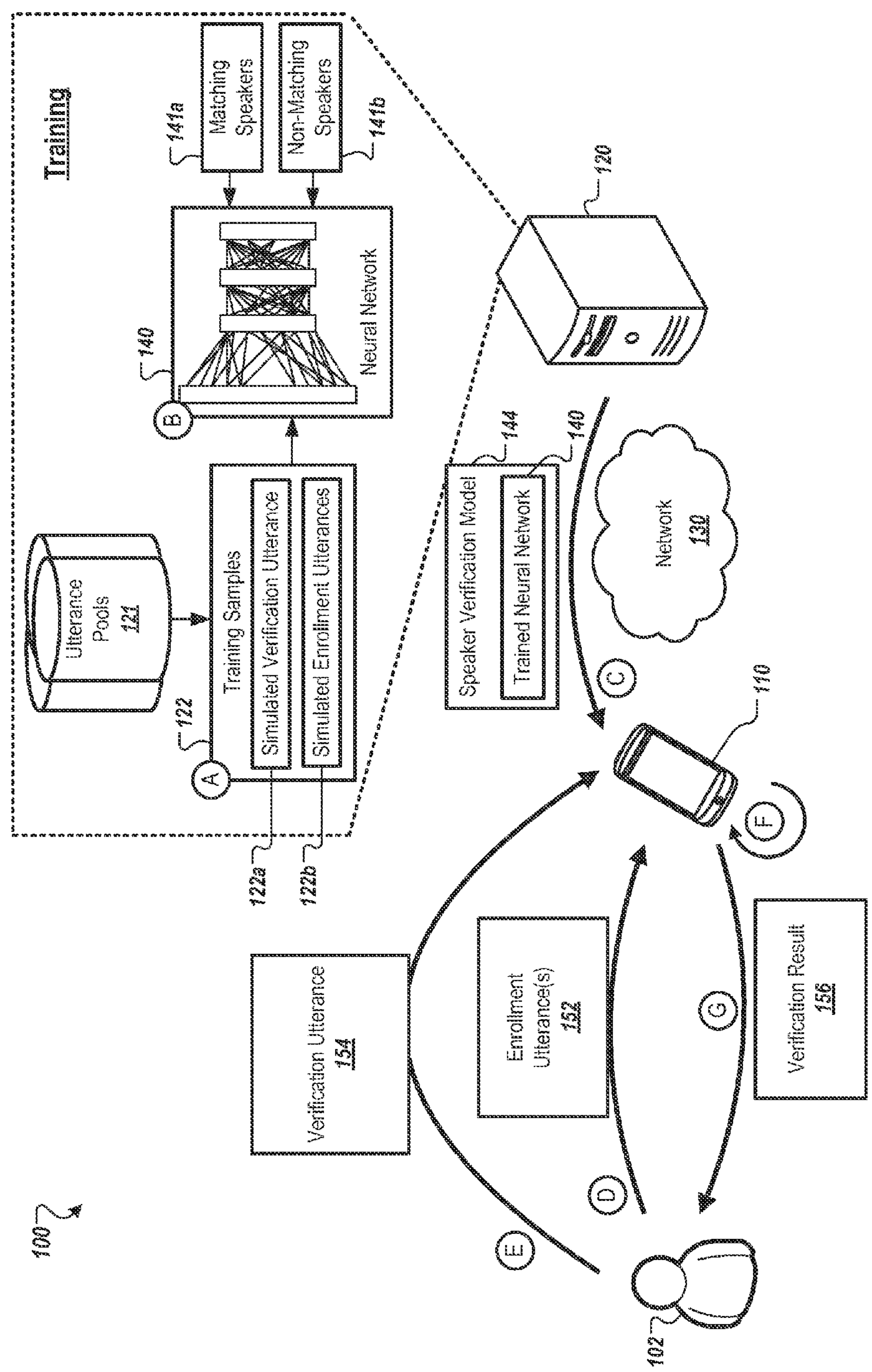
FIG. 1 depicts a schematic diagram of an example client device and computing system carrying out operations to (i) train a neural network, (ii) enroll a user at a computing device, and (iii) verify an utterance of a user of the computing device based on distinctive features of the user's voice.

FIG. 1 is a schematic diagram of an example system 100 for training a neural network for a speaker verification model, and for carrying out a process of speaker verification using the model. Generally, speaker verification is the task of accepting or rejecting the identity claim of a speaker based on characteristics of the speaker's voice, as determined from one or more utterances of the speaker. As depicted in FIG. 1, speaker verification can generally include three phases, namely (i) training of a neural network for the speaker verification model, (ii) enrollment of a new speaker, and (iii) verification of the enrolled speaker.

The system 100 includes a client device 110, a computing system 120, and a network 130. In some implementations, the computing system 120 may provide a speaker verification model 144 based on a trained neural network 140 to the client device 110. In some implementations, the speaker verification model 144 may be pre-installed on the client device 110, for example, as a component of an operating system or application. In other implementations, the speaker verification model 144 may be received over the network 130. The client device 110 may use the speaker verification model 144 to enroll the user 102 to the speaker verification process. When the identity of the user 102 needs to be verified at a later time, the client device 110 may receive a speech utterance of the user 102 to verify the identity of the user 102 using the speaker verification model 144. Because the speaker verification model 144 may be stored locally at the client device 110, the client device 110 may be able to make a speaker verification decision without communication over the network 130.

Although not shown in FIG. 1, in some implementations, the computing system 120 may store the speaker verification model 144 based on the trained neural network 140, rather than or in addition to the neural network 140 being stored on the client device 110. In these implementations, the client device 110 may communicate with the computing system 120 via the network 130 to remotely access and use the speaker verification model 144 for enrollment of the user 102. When the identity of the user 102 needs to be verified at a later time, the client device 110 may receive a speech utterance of the user 102, and may communicate with the computing system 120 via the network 130 to verify the identity of the user 102 using the remotely located speaker verification model 144. The computing system 120 and the computing device 110 may be distinct and physically separate from each other.

In the system 100, the client device 110 can be, for example, a desktop computer, laptop computer, a tablet computer, a watch, a wearable computer, a cellular phone, a smart phone, a music player, an e-book reader, a navigation system, or any other appropriate computing device that a user may interact with. In some implementations, the client device 110 may be a mobile computing device. The computing system 120 can include one or more computers, and may perform functions on individual ones of the computers, or the functions may be distributed for performance across multiple computers. The network 130 can be wired or wireless or a combination of both and can include the Internet.

In some implementations, a client device 110, such as a phone of a user, may store a speaker verification model 144 locally on the client device 110, allowing the client device 110 to verify a user's identity without relying on a model at a remote server (e.g., the computing system 120) for either the enrollment or the verification process, and therefore may save communication bandwidth and time. Moreover, in some implementations, when enrolling one or more new users, the speaker verification model 144 described here does not require any retraining of the speaker verification model 144 using the new users, which can also be computationally efficient. In other implementations, utterances of a given user that are provided for enrollment, verification, or both, may be provided to the computing system 120 and added to the training data so that the neural network (and thus the speaker verification model) may be regularly updated based using newly collected training data.

It is desirable that the size of the speaker verification model 144, including the trained neural network 140, be compact because the storage and memory space on the client device 110 may be limited. As described below, the speaker verification model 144 is based on a trained neural network 140. The speaker verification model 144 may include the neural network 140 to generate, based on data that characterizes an utterance, a speaker representation that indicates distinctive features of the voice of a speaker of the utterance. The speaker verification model 144 may include further components to process the speaker representation and to determine whether the voice of the speaker of the utterance is sufficiently similar to the voice of an enrolled user, such that an identity claim of the speaker of the utterance can be verified.

In some implementations, the neural network may be trained using a large set of training data. Various techniques may be applied during pre-processing of the training data, during training itself, or during a post-training stage to enforce and/or reduce a size of the neural network so as to achieve a compact model size. For example, the speaker verification model 144 may be constructed by selecting only certain layers of the neural network 140, which may result in a compact speaker verification model suitable for storage on the client device 110. Enrollment may be performed without a softmax or other classification layer in generating the speaker representations for the speaker model.

FIG. 1 also illustrates an example flow of data, shown in stages (A) to (F). Stages (A) to (F) may occur in the illustrated sequence, or they may occur in a sequence that is different than in the illustrated sequence. In some implementations, one or more of the stages (A) to (F) may occur offline, where the computing system 120 may perform computations when the client device 110 is not connected to the network 130. Stages (A) and (B) generally occur during the training phase that was referred to above. Stage (D) generally occurs during the enrollment phase. Stages (E)-(G) generally occur during the verification phase.

At stage (A), the computing system 120 selects samples of training utterances to provide to the neural network 140 for supervised training of the neural network 140. In some implementations, the utterances in the training samples 122 may each consist of one or more predetermined words spoken by many different training speakers, the utterances having been previously recorded and made accessible for use by the computing system 120. Each training speaker may speak a predetermined utterance to a computing device, and the computing device may record an audio signal that includes the utterance. For example, each training speaker may be prompted to speak the training phrase "Hello Phone." In some implementations, each training speaker may be prompted to speak the same training phrase multiple times. The recorded audio signal of each training speaker may be transmitted to the computing system 120, and the computing system 120 may collect the recorded audio signals from many different computing devices and many different training speakers. In some implementations, the neural network 140 may be optimized for text-dependent speaker verification, in that a user's identity may be verified based on characteristics of the user's voice determined from an utterance of the pre-defined training phrase. In such implementations, the neural network 140 may be trained on utterances that all, or substantially all, include the pre-defined training phrase. In other implementations, the neural network 140 may be trained to allow for text-independent speaker verification, in that a user's identity may be verified based on characteristics of the user's voice determined from an utterance of a wide variety of words or phrases, which may not be pre-defined. For example, a user could independently decide which words or phrases that he or she wishes to speak to verify his or her identity, and the speaker verification model based on the trained neural network 140 could then authenticate the user given the spoken words or phrases. To allow for text-independent speaker verification, the neural network 140 may be trained on utterances of a wide variety of words or phrases spoken by many different training speakers.

At stage (B), the neural network 140 may be trained in a manner that parallels the enrollment and verification of users at a client device. Accordingly, the computing system 120 can select in each training sample 122 a set of simulated enrollment utterances **122*b* and a simulated verification utterance 122*a*. The simulated enrollment utterances 122*b* may all be utterances of the same training speaker, such that a simulated speaker model can be determined for each training sample 122. The simulated verification utterance 122*a* may be an utterance of the same speaker as the speaker of the simulated enrollment utterances 122*b*, or may be an utterance of a different speaker. The training samples 122 can then be provided to the neural network 140, and a classification can be made based on outputs of the neural network 140 as to whether the simulated verification utterance 122*a* was spoken by the same speaker as the speaker of the simulated enrollment utterances 122*b*, or by a different speaker from the speaker of the simulated enrollment utterances 122*b*. The neural network 140 can then be updated based on whether the speaker determination was correct. In some implementations, each training sample 122 may be labeled as belonging to one of two classes: a matching speakers class 141*a* (for samples where the speakers of the simulated verification and enrollment utterances are the same) and a non-matching speakers class 141*b* (for samples where the speakers of the simulated verification and enrollment utterances are different). These labels indicate the ground truth of whether the same speaker spoke the utterances 122*a* and the utterances 122*b*. The correctness of the classification of a training sample 122 can be determined based on the sample's label. In some implementations, the adjustments to the neural network may not be based strictly on the correctness of a classification of an input sample, but may generally be based on one or more metrics determined from a comparison of speaker representations generated by the neural network for the simulated verification utterance 122***a* and the simulated enrollment utterances 122*b*. In some implementations, the training samples 122 may be selected from a repository of training data, which may be organized into utterance pools 121. Each of the utterance pools 121 may include training utterances that are grouped by the training speaker of the utterances.

The neural network 140 may include an input layer for inputting information about the utterances in the training samples 122, and several hidden layers for processing the samples 122. The weights or other parameters of one or more hidden layers may be adjusted so that the trained neural network 140 produces output that causes the speaker verification model 144 to generate the desired classification of the training samples 122 as having either matching or non-matching speakers among the simulated verification and enrollment utterances of the samples 122. In some implementations, the parameters of the neural network 140 may be adjusted automatically by the computing system 120. In some other implementations, the parameters of the neural network 140 may be adjusted manually by an operator of the computing system 120. The training phase of a neural network is described in more details below in the descriptions of FIGS. 2, 3, 4A-B, and 5A-B, for example.

At stage (C), once the neural network 140 has been trained, a speaker verification model 144 based on the trained neural network 140 is transmitted from the computing system 120 to the client device 110, for example, through the network 130. In some implementations, the trained neural network 140, or a portion thereof, may be a component of the speaker verification model 144. The speaker verification model 144 can be configured to verify an identity of the user 102 based on characteristics of the user's voice determined from one or more utterances of the user 102. The model 144 may be configured to provide data characterizing an utterance of the user 102 as input to the trained neural network 140, in order to generate a speaker representation for the user 102 that indicates distinctive features of the user's voice. The speaker representation can then be compared to a model of the user's voice that has been previously determined. If the speaker representation is sufficiently similar to the user's speaker model, then the speaker verification model 144 can output an indication that the identity of the user 102 is valid. In contrast, if the speaker representation is not sufficiently similar to the user's speaker model, then the speaker verification model 144 can output an indication that the identity of the user 102 is invalid (not verified).

At stage (D), a user 102 who desires to enroll his or her voice with the client device 110 provides one or more enrollment utterances 152 to the client device 110 in the enrollment phase. In general, the user 102 is not one of the training speakers whose voices were used in training the neural network 140. In some implementations, the client device 110 may prompt the user 102 to speak an enrollment phrase that is the same phrase spoken by the set of training speakers in the utterances of the training samples 122. In some implementations, the client device 110 may prompt the user to speak the enrollment phrase several times, and may record audio signals for the spoken enrollment utterances as the enrollment utterances 152.

The client device 110 uses the enrollment utterances 152 to enroll the user 102 in a speaker verification system of the client device 110. In general, the enrollment of the user 102 is done without retraining the neural network 140. Respective instances of the same speaker verification model 144 may be used at many different client devices, and for enrolling many different speakers, without requiring that changes be made to the weight values or other parameters in the neural network 140. Because the speaker verification model 144 can be used to enroll any user without retraining the neural network 140, enrollment may be performed at the client device 110 with limited processing requirements.

In some implementations, information about the enrollment utterances 152 is input to the speaker verification model 144, and the speaker verification model 144 may output a reference vector or other set of values corresponding to the user 102. The reference vector or other set of values may constitute a speaker model that characterizes distinctive features of the user's voice. The speaker model may be stored on the client device 110, or at a computing system remote from the client device 110, so that speaker representations generated based on utterances later received by the client device 110 may be compared against the speaker model to verify whether respective speakers of the later-received utterances are the user 102 or are other speakers.

At stage (E), the user 102 attempts to gain access to the client device 110 using voice authentication. The user 102 provides a verification utterance 154 to the client device 110 in the verification phase. In some implementations, the verification utterance 154 is an utterance of the same phrase that was spoken as the enrollment utterance 152. The verification utterance 154 is used as input to the speaker verification model 144.

At stage (F), the client device 110 determines whether the user's voice is a match to the voice of the enrolled user. In some implementations, the neural network 140 may process data that characterizes the verification utterance 154, and may output a speaker representation for the user 102 based on the verification utterance 154. In some implementations, the client device 110 may compare the speaker representation for the user 102 with the speaker model for the enrolled user to determine whether the verification utterance 154 was spoken by the enrolled user. The verification phase of a neural network is described in more detail below with respect to FIG. 6, for example.

At stage (G), the client device 110 provides an indication that represents a verification result 156 to the user 102. In some implementations, if the client device 110 has accepted the identity of the user 102, the client device 110 may send the user 102 a visual or audio indication that the verification is successful. In some other implementations, if the client device 110 has accepted the identity of the user 102, the client device 110 may prompt the user 102 for a next input. For example, the client device 110 may output a message "Device enabled. Please enter your search" on the display. In some other implementations, if the client device 110 has accepted the identity of the user 102, the client device 110 may perform a subsequent action without waiting for further inputs from the user 102. For example, the user 102 may speak "Hello Phone, search the nearest coffee shop" to the client device 110 during the verification phase. The client device 110 may verify the identity of the user 102 using the verification phrase "Hello Phone." If the identity of the user 102 is accepted, the client device 110 may perform the search for the nearest coffee shop without asking the user 102 for further inputs. Generally, in some implementations, if the client device 110 has accepted the identity of the user 102, the client device 110 may respond by transitioning from a locked state, in which one or more capabilities of the client device 110 are disabled or blocked, to an unlocked state, in which the capabilities are enabled or otherwise made available to the user 102 to access. Similarly, the client device 110 may "wake" or transition from a low-power state to a more fully-featured state in response to a successful verification.

In some implementations, if the client device 110 has rejected the identity of the user 102, the client device 110 may send the user 102 a visual or audio indication that the verification is rejected. In some implementations, if the client device 110 has rejected the identity of the user 102, the client device 110 may prompt the user 102 for another utterance attempt. In some implementations, if the number of attempts exceeds a threshold, the client device 110 may block the user 102 from further attempting to verify his or her identity.

Figure 2:
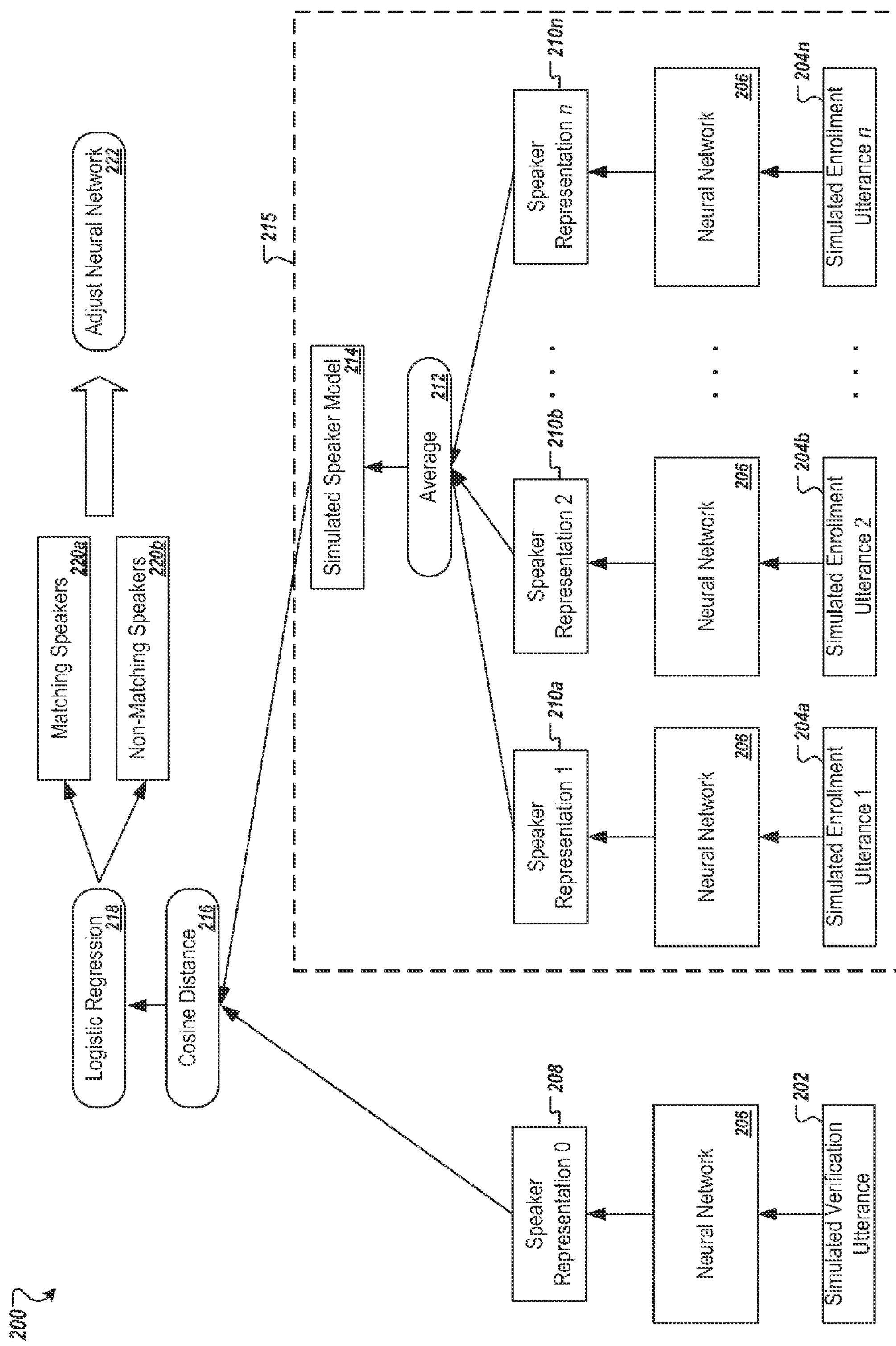
FIG. 2 depicts a block diagram of an example system for training a neural network to determine speaker representations for use in speaker verification tasks.

Turning to FIG. 2, a block diagram is shown of an example system 200 for training a neural network 206. At a completion of the training phase illustrated by FIG. 2, the trained neural network 206 may be capable of processing data that characterizes an utterance of a speaker, and generating a speaker representation for the speaker that indicates distinctive features of the speaker's voice. The speaker representation may then be used by a speaker verification model in either generating a speaker model for the speaker during the enrollment phase, or in verifying an identity of the speaker during the verification phase.

Generally, FIG. 2 illustrates that the neural network 206 may be trained in a manner that parallels the enrollment and verification phases that later occur at client devices performing a speaker verification task. Unlike some approaches that train the neural network 206 to classify training utterances from a finite number of speakers into corresponding classes for each of the speakers, the neural network 206 in FIG. 2 is not trained to determine the particular speaker of a given utterance. Instead, the neural network 206 is trained to generate speaker representations that are distinctive and usable to determine whether or not the speaker of a given utterance is the same as the speaker of another set of utterances, without necessarily matching any of the utterances to a specific speaker identity. In this way, the loss function optimized during training is the same function utilized by the speaker verification model during the verification phase. In other words, during verification, a speaker representation based on a verification utterance is compared to a speaker model for an enrolled user. If the speaker representation is sufficiently similar to the speaker model, then an identity of the speaker of the verification utterance is verified. The approach depicted in FIG. 2 employs similar techniques during training. Namely, a simulated speaker model 214 is generated based on speaker representations for one or more enrollment utterances, and a speaker representation 208 is also generated for a simulated verification utterance 202. The weight values and other parameters of the neural network 206 are adjusted during training so as to minimize the error in classifying the simulated verification utterance 202 as being spoken by a same or different speaker as the simulated enrollment utterances 204*a-n*.

Figure 4A:
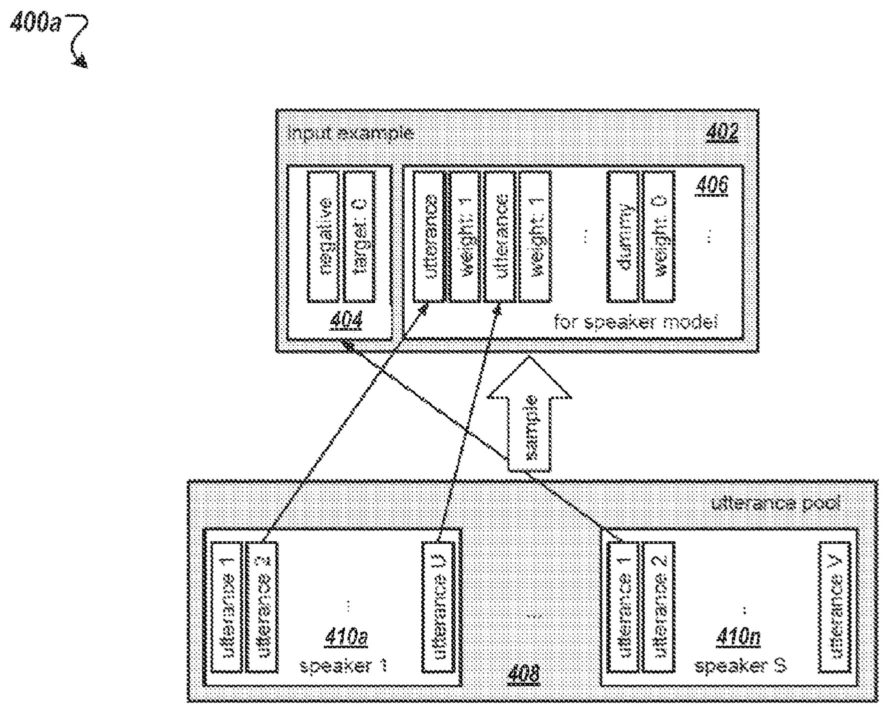
FIG. 4A is a conceptual diagram illustrating an example selection of a subset of training utterances from groups of utterances for different speakers within an utterance pool.
Figure 4B:
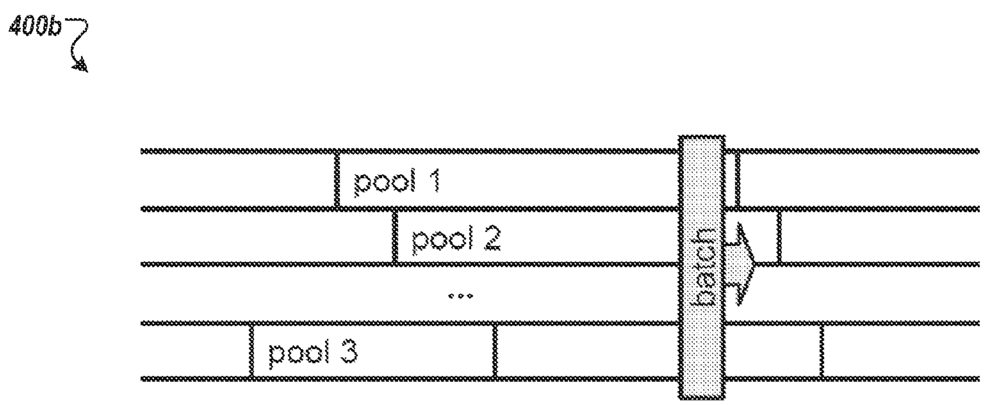
FIG. 4B is a conceptual diagram illustrating an example selection of a batch of training data from utterance pools for training a neural network.

FIG. 2 depicts a forward pass of a single training iteration based on a sample of training data that includes data characterizing a simulated verification utterance 202 and data characterizing one or more simulated enrollment utterances 204*a-n*. In practice, the neural network 206 is trained over many iterations and many different samples of training data. With each iteration, the neural network 206 may be adjusted based on results of processing the corresponding sample of training data for the respective iteration. FIGS. 4A and 4B, described further below, depict example techniques by which the simulated verification utterance 202 and the simulated enrollment utterances 204*a-n* may be selected. The simulated enrollment utterances 204*a-n* for a particular sample are generally all utterances spoken by the same training speaker. Although the speaker of the simulated enrollment utterances 204*a-n* may be different among different samples of training data for different training iterations, within a given training sample for a given training iteration all of the enrollment utterances 204*a-n* are generally spoken by the same training speaker. The simulated verification utterance 202 may have been spoken by the same training speaker as the speaker of the simulated enrollment utterances 204*a-n*, or may have been spoken by a different training speaker than the speaker of the simulated enrollment utterances 204*a-n*. For samples of training data in which the speaker is the same among both the simulated verification utterance 202 and the simulated enrollment utterances 204*a-n*, the sample may be labeled as a "matching" sample. For samples of the training data in which the speaker is different among the simulated verification utterance 202 and the simulated enrollment utterances 204*a-n*, the sample may be labeled as a "non-matching" sample. The labels may represent true classifications of the training samples, and may be determined in a pre-processing phase before training. In some implementations, the estimated classification of a training sample based on output of the neural network 206 may be compared to the true classification indicated by the label for the training sample to determine whether to adjust the neural network 206.

In some implementations, the data in the training sample may not be the raw audio signals for the simulated verification and enrollment utterances 202, 204*a-n*. Instead, the utterances 202, 204*a-n* may have been processed and converted into an appropriate format for processing by the neural network 206. For example, the data in the training sample may characterize respective features of the simulated verification and enrollment utterances 202, 204*a-n*, rather than the raw audio signals themselves. In some implementations, the data representing each of the simulated utterances 202, 204*a-n* in the training sample may include one or more log-filterbanks for the respective utterance. In some implementations, each utterance may be segmented in time into a plurality of frames for the utterance, and separate log-filterbanks can be generated for each frame of the utterance. For example, each frame of the utterance may be represented by, say, forty log-filterbanks.

In some implementations, the data characterizing the simulated verification utterance 202 and the data characterizing each of the simulated enrollment utterances 204*a-n* can be processed at once (i.e., in a single pass) through the neural network 206. Thus, even though the training data for a given utterance is segmented into multiple frames that are each represented by a respective set of log-filterbanks, the data characterizing all of the frames for an entirety of the utterance can be inputted into the neural network 206 (e.g., as an 80×40 feature vector for 80 frames with 40 log-filterbanks each) for processing in a single pass through the neural network. This stands in contrast to individually inputting data for each frame of the utterance into the neural network 206 for separate processing of the frames. In other implementations, data characterizing individual frames of the utterances 202, 204*a-n* can be provided as input to the neural network 206, rather than training the neural network 206 to process data characterizing an entirety of each utterance 202, 204*a-n* in a single pass through the neural network 206.

In some implementations, the simulated verification and enrollment utterances 202, 204*a-n* may be pre-processed according to one or more additional techniques. For example, the structure of the neural network 206 may require that the training utterances all have a fixed length (e.g., 0.8 seconds of audio). At least some of the utterances 202, 204*a-n* may thus be the result of cropping longer utterances to a uniform length, and/or padding some shorter utterances to make longer clips. In other implementations, however, the neural network 206 may be capable of processing variable length utterances, in which case the utterances 202, 204*a-n* in the training data may not be cropped or padded to a fixed length. The audio for the utterances 202, 204*a-n* may also have been equalized, and noise may have been added or removed from the training utterances 202, 204*a-n* to ensure that the neural network is trained to perform robustly in the presence of noise.

The portion of the system 200 within dashed-line box 215 simulates the enrollment phase of a speaker verification process, in that data characterizing a plurality of simulated enrollment utterances 204*a-n* are used to generate a simulated speaker model 214 for the particular training speaker of the simulated enrollment utterances 204*a-n*. The respective data characterizing each of the simulated enrollment utterances 204*a-n* is separately inputted into the neural network 206 at an input layer of the neural network 206. The neural network 206 processes the data through one or more hidden layers, and generates a respective speaker representation 210*a-n* for each of the simulated enrollment utterances 204*a-n*. For example, as shown in FIG. 2, speaker representation 1 (210*a*) is generated by the neural network 206 based on simulated enrollment utterance 1 (204*a*). Likewise, speaker representation 2 (210*b*) is generated by the neural network 206 based on simulated enrollment utterance 2 (204*b*). A speaker representation can thus be generated by the neural network 206 for each of the simulated enrollment utterances 204*a-n*. In some implementations, the speaker representations 210*a-n* may be generated by serially processing each of the simulated enrollment utterances 204*a-n* through the neural network 206. In some implementations, the speaker representations 210*a-n* can be generated concurrently by parallel processing the data that characterizes the utterances 204*a-n* with respective instances of the neural network 206 for each of the simulated enrollment utterances 204*a-n*. The speaker representations 210*a-n* generally each include a collection of values that represent distinctive characteristics of the simulated-enrollment training speaker's voice, as determined by the neural network 206 based on a corresponding one of the simulated enrollment utterances 204*a-n*. In some implementations, the speaker representations 210*a-n* may indicate the weight values or other parameters of a last hidden layer of the neural network 206. In some implementations, the speaker representations 210*a-n* may be a final output of the neural network 206 when the neural network 206 is configured without a softmax output layer.

To generate the simulated speaker model 214, the speaker representations 210*a-n* can be averaged, as shown in box 212 of FIG. 2. Accordingly, the simulated speaker model 214 may define a collection of values that represent the distinctive characteristics of the voice of the training speaker of the simulated enrollment utterances 204*a-n*. By averaging multiple speaker representations 210*a-n* to determine the simulated speaker model 214, variations in the speaker's voice among the different simulated enrollment utterances 204*a-n* can be smoothed. The simulated speaker model 214 may thus be a more reliable representation of the speaker's voice than any of the individual speaker representations 210*a-n*, which may individually reflect idiosyncrasies of a given simulated enrollment utterance 204*a-n*.

In some implementations, the total number of simulated enrollment utterances 204*a-n* in each sample of training data for each training iteration may vary. For example, a first training sample for a first training iteration may include 9 simulated enrollment utterances 204*a-n*. A second training sample for a second training iteration, however, may include only 4 simulated enrollment utterances 204*a-n*. In other implementations, the total number of simulated enrollment utterances 204*a-n* in each sample of training data for each training iteration may be fixed. For example, the neural network 206 may be trained over a series of iterations in which the set of training data for each iteration includes a total of 5 simulated enrollment utterances 204*a-n*. In some implementations, one, some, or all of the training iterations may be performed with training samples that include just a single simulated enrollment utterance 204*a-n*.

In the same manner that the speaker representations 210*a-n* were generated from the data that characterizes the simulated enrollment utterances 204*a-n*, a speaker representation 208 can be generated from data that characterizes the simulated verification utterance 202. The data that characterizes the simulated verification utterance 202 (e.g., log-filterbank values characterizing features of the verification utterance 202) can be provided to an input layer of the neural network 206. The neural network 206 then processes the input through one or more hidden layers of the network. The output of the neural network 206 is a speaker representation 208 that defines a collection of values indicating distinctive characteristics of a voice of a speaker who spoke the simulated verification utterance 202.

To further parallel the verification phase during training of the neural network 206, the speaker representation 208 based on the simulated verification utterance 202 can be compared to the simulated speaker model 214 in the same manner that would occur on a client device, for example, by the speaker verification model during the verification phase. In some implementations, the comparison can be performed by taking the cosine distance (as shown in block 216) of (1) a first vector defining the collection of values for the simulated speaker representation 208 and (2) a second vector defining the collection of values for the simulated speaker model 214. A logistic regression 218 can then be applied to the distance to estimate whether the training speaker who spoke the simulated verification utterance 202 is the same or different than the training speaker who spoke the simulated enrollment utterances 204*a-n*. This is represented in FIG. 2 by a first block 220*a* for a matching speakers class, and a second block 220*b* for a non-matching speakers class. In some implementations, classification techniques other than a logistic regression 218 may be applied to make a determination as to whether the training speaker who spoke the simulated verification utterance 202 is the same or different than the training speaker who spoke the simulated enrollment utterances 204*a-n*. For example, a hinge layer or a softmax layer may be used for the classification in some alternatives. In a two-class model like that shown in FIG. 2, the softmax and logistic regression techniques may use a same or similar optimization function.

The weight values or other parameters of the neural network 206 can then be adjusted, as represented by block 222, based on a result of the comparison of the speaker representation 208 for the simulated verification utterance 202 with the simulated speaker model 214. For example, if the training sample were labeled as truly having non-matching speakers, incorrectly classified the training sample as having matching speakers, then the neural network 206 may be automatically adjusted to correct the error. More generally, the neural network 206 may be optimized so as to maximize the similarity score for matching speakers samples or to optimize a score output by the logistic regression, and the neural network 206 may also be optimized so as to minimize the similarity score for non-matching speakers samples or to optimize the score output by the logistic regression. In some implementations, adjustments to the neural network 206 can occur in response to the results of each training sample for each training iteration, or the neural network 206 may be adjusted based on the results of only some of the training iterations. In some implementations, the neural network 206 may be adjusted so as to maximize the distance (i.e., maximize differences) between the speaker representation 208 and the simulated speaker model 214 for non-matching speakers, while minimizing the distance (i.e., minimize differences) between the speaker representation 208 and the simulated speaker model 214 for matching speakers. Note that, in some implementations, a hard decision to classify a training sample as belonging to either the matching speakers class 220*a* or the non-matching speakers class 220*b* may not be made during the training phase. Rather, the neural network 206 may be adjusted in a manner that optimizes the scores output by the logistic regression layer 218, or that optimizes one or more other metrics.

Figure 3:
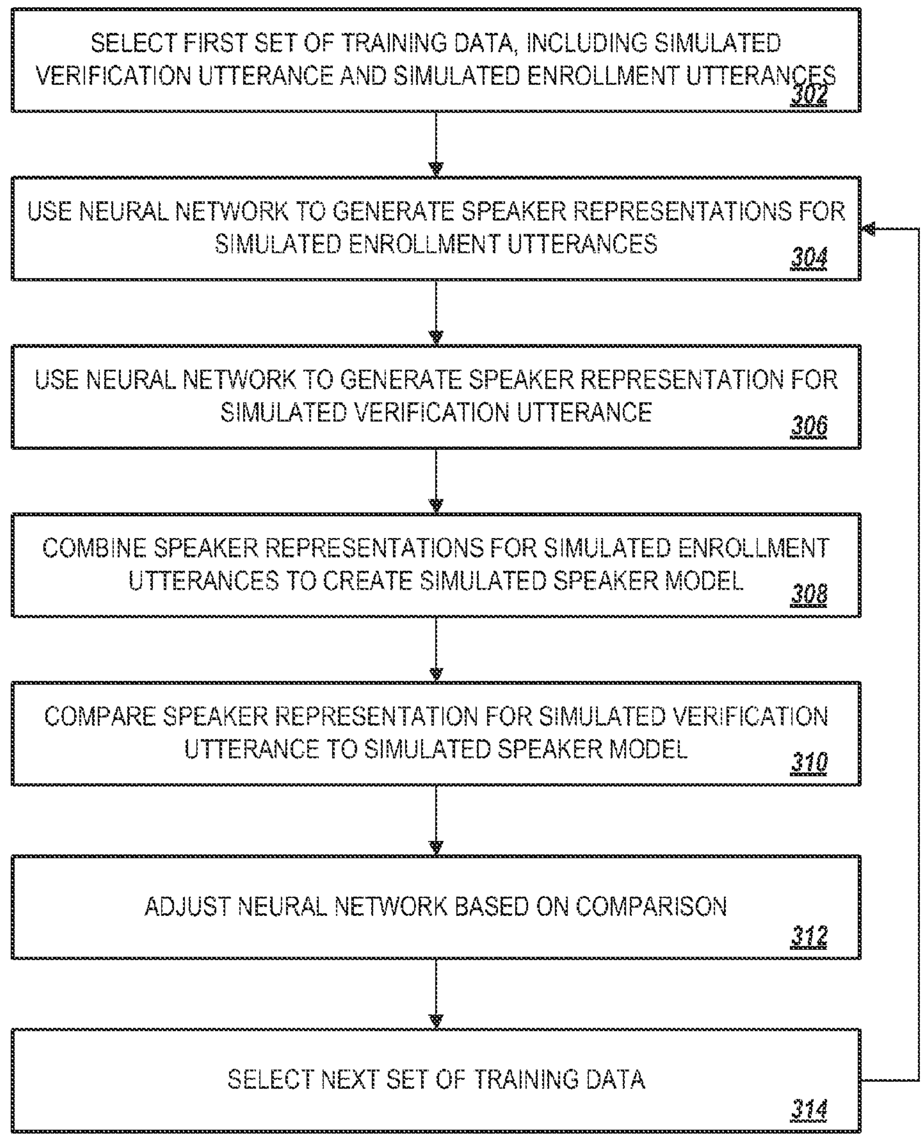
FIG. 3 depicts a flowchart of an example process for training a neural network to determine speaker representations that indicate distinctive characteristics of voices.

Referring now to FIG. 3, a flowchart is shown of an example process 300 for training a neural network that may be used in a speaker verification model. In some implementations, the process 300 may be carried out by the computing systems described herein, such as the computing system 120 from FIG. 1 and the computing system 200 from FIG. 2.

The process 300 commences at stage 302, where a first set of training data is selected (i.e., a first training sample). The first set of training data can include data characterizing a simulated verification utterance and data characterizing one or multiple simulated enrollment utterances. The utterances in the training set are "simulated" in that they are used in the training process in a manner that parallels, or "simulates," the enrollment and verification phases of speaker verification during the training phase. However, the utterances themselves are generally real snippets of recorded speech spoken by training speakers. The training speakers are generally not the same speakers who provide utterances during the actual enrollment and verification phases of the speaker verification process. FIGS. 4A and 4B, which are described further below, depict example techniques for selecting the simulated verification and enrollment utterances.

The selected set of training data (i.e., the selected sample) may be labeled according to whether it represents speech of matching speakers or a sample for non-matching speakers. If the speaker of the simulated verification utterance is the same as the speaker of the simulated enrollment utterances, then the set of training data is labeled as a matching speaker sample. If the speaker of the simulated verification utterance is different from the speaker of the simulated enrollment utterances, then the set of training data is labeled as a non-matching speaker sample. In some implementations, the labels can be used later in the training process 300 to determine whether an estimated classification of the set of training data as either being a matching or non-matching sample is accurate or not.

In some implementations, the selected set of training data may include not the raw audio signal for the simulated verification and enrollment utterances, but instead data that characterizes features of the utterances. For example, each utterance represented in the set of training data can be characterized by a set of log-filterbanks determined for fixed-length frames of the utterance. The log-filterbanks for each frame of the utterance may then be concatenated into a single set of input values that are provided as input to the neural network and that characterize an entirety of the utterance.

At stages 304 and 306 of the process 300, speaker representations are determined for each of the utterances characterized in the first set of training data. The speaker representations can each be a collection of values that indicate distinctive features of a voice of the training speaker who spoke the corresponding utterance for the respective speaker representation. For example, a first speaker representation may be generated based on the simulated verification utterance, and respective second speaker representations may be generated based on each of the simulated enrollment utterances. To generate the speaker representations, the data characterizing an utterance is provided to an input layer of the neural network being trained. The neural network then processes the input data through one or more hidden layers of the network. The speaker representation is then an output of the neural network. In some implementations, the output is output at an output layer that is not a softmax layer. The final layer providing the output may be a fully connected, linear layer. In some implementations, the speaker representation may include the values generated at or activations of a last hidden layer of the neural network, rather than the output of a softmax output layer. The neural network may be configured without a softmax output layer in some implementations.

At stage 308, the speaker representations corresponding to the simulated enrollment utterances are combined to create a simulated speaker model. The simulated speaker model can be an average of the speaker representations for the simulated enrollment utterances. By averaging the speaker representations, a reliable model characterizing the voice of the training speaker can be determined. For example, variations in the manner that the speaker spoke each of the simulated enrollment utterances may be smoothed so that the speaker model can be used a robust baseline to which the speaker representation for the simulated verification utterance is compared. In some implementations, the process 300 may select only a subset of the speaker representations for the simulated enrollment utterances to combine in generating the simulated speaker model. For example, a measure of quality of each of the simulated enrollment utterances or the corresponding simulated enrollment utterances may be determined. The process 300 may then select only those speaker representations that meet a threshold quality score, or those speaker representations whose corresponding utterances meet a threshold quality score, for inclusion in the set of representations used to generate the simulated speaker model.

At stage 310, the speaker representation for the simulated verification utterance is compared to the simulated speaker model. In some implementations, a binary classifier is used to classify the data sample as representing matching speakers or not. In some implementations, the comparison can include determining a measure of similarity between the speaker representation for the simulated verification utterance and the simulated speaker model. For example, the measure of similarity may be a cosine distance between a vector of values for the speaker representation and a vector of values for the simulated speaker model. The measure of similarity may then be used to estimate a classification of the first set of training data as either a matching speakers sample or a non-matching speakers sample. For example, if the measure of similarity is sufficiently high (e.g., meets a threshold similarity score), then a logistic regression may be used to map the set of training data to a class of matching speakers. On the other hand, if the measure of similarity is too low (e.g., does not meet the threshold similarity score), then the logistic regression may be used to map the set of training data to a class of non-matching speakers.

Next, at stage 312, one or more parameters of the neural network may be adjusted based on a result of the comparison at stage 310 between the speaker representation for the simulated verification utterance and the simulated speaker model. For example, the weights of the various nodes in the hidden layers, or other parameters of the neural network may be adjusted so as to increase the distance (reduce the similarity score) between the speaker representation and the simulated speaker model if the training data was labeled as a non-matching speakers sample. Additionally, the weights or other parameters of the neural network may be adjusted to reduce the distance (increase the similarity score) between the speaker representation and the simulated speaker model if the training data was labeled as a matching speakers sample. Generally, as each iteration of the training process 300 is intended to simulate a respective enrollment phase and respective verification phase, the neural network may be adjusted to optimize a same loss function as that which is applied during actual enrollment and verification phases during speaker verification. One benefit of this approach is that the neural network is trained to better generate speaker representations that can be used in a speaker verification model for more accurate verification of a speaker's identity. For example, in some implementations, no additional post-processing steps are taken during actual verification of an utterance that are not taken in to account when training the neural network. These techniques may thus be considered an "end-to-end" approach to training the neural network.

Lastly, at stage 314, a next set of training data is selected for another iteration of training the neural network. Again, the set of training data selected at this stage may include data that characterizes a simulated verification utterance and data that characterizes one or more simulated enrollment utterances. The process 300 may then repeat stages 304-312, and continue selecting additional sets of training data for additional training iterations until a limit is reached. In some implementations, the limit may result from expiring all of the available training data. In some implementations, the process 300 may continue until a target performance level is reached. For example, after a number of training iterations, the neural network may be tested against a held-out set of data that was not used during the training process 300. Training may continue until tests on the held-out set indicate that the neural network has achieved at least the target performance level.

Referring now to FIGS. 4A and 4B, schematic diagrams are shown that illustrate example techniques for selecting sets of training data to use in training a neural network for a speaker verification model. In some implementations, the techniques described with respect to FIGS. 4A and 4B can ensure diversity in the training utterances that are selected across many training iterations, which may result in a better performing neural network for a given number of training utterances.

In some implementations, all or a portion of the available training utterances may be clustered into a plurality of groups 410*a-n*. The groups 410*a-n* may be further arranged into an utterance pool 408 that includes a collection of groups of training utterances. The training utterances may be grouped by speaker in some implementations. For example, group 410*a* includes a plurality of utterances that were all spoken by a first speaker, whereas group 410*n* includes a plurality of utterances that were all spoken by another speaker. Accordingly, each of the groups 410*a-n* may correspond to different speakers. The groups 410*a-n* may all contain the same number of training utterances, or the number of training utterances may vary among different ones of the groups 410*a-n*.

For each training iteration, the utterance pool 408 may be accessed, and particular utterances may be selected for the sample of training data that will be applied as input in the respective training iteration. For example, FIG. 4A shows one set of training data that was randomly selected from the utterance pool 408 for a training iteration as input sample 402. A first group of utterances, corresponding to a first speaker, can be selected from the groups 410*a-n* in the utterance pool 408 for use in generating the simulated speaker model. The group may be selected randomly or in another manner. From the selected group, e.g., group 410*a* in FIG. 4A, a subset of the utterances of the first speaker are selected as simulated enrollment utterances 406 in the input sample 402. This subset generally includes multiple utterances, and may include the same or a different number of utterances from one training iteration to another. Utterances from the selected group, e.g., group 410*a*, may be selected randomly so that different combinations of the utterances are used to generate different simulated speaker models for the first speaker in different training iterations.

An utterance 404 is also selected as a simulated verification utterance. The utterance 404 may be an utterance of the first speaker or of a different speaker, depending on whether the training iteration is an example of a match or a non-match with the enrollment utterances 406. Both matching and non-matching examples are used in training. As a result, for some training iterations, the utterance 404 is an utterance of the first speaker, e.g., an utterance from group 410*a*. For other training iterations, the utterance 404 is an utterance of a second speaker that is different from the first speaker, as shown in FIG. 4A, so that the input sample 402 does not represent a match between the simulated verification utterance 404 and the simulated enrollment utterances 406.

In the example of FIG. 4A, a particular utterance is selected (e.g., randomly selected) from a second group 410*n* of utterances as the simulated verification utterance 404. In some implementations, the second group of utterances (from which the utterance 404 is selected) may be selected randomly from among the groups 410*a-n* in the utterance pool 408, or according to a pattern of varying selection of the groups 410*a-n*. In other implementations, a random selection may be made as to whether another utterance from the same speaker as the speaker of the simulated enrollment utterances should be applied as the simulated verification utterance. Thus, perhaps the random selection is biased so that a fifty percent probability exists that the simulated verification utterance 404 will be an utterance of the same speaker as the speaker of the simulated enrollment utterances 406. If a result of the random selection is that the input sample 402 is to be a matching speaker sample, then the simulated verification utterance 404 can be selected from the same group of utterances 410 as the group of utterances from which the simulated enrollment utterances 406 were selected. But if a result of the random selection is that the input sample 402 is to be a non-matching speaker sample, then the simulated verification utterance 404 can be selected from a different group of utterances 410 corresponding to a different speaker than the group of utterances from which the simulated enrollment utterances 406 were selected.

Generally, the selection techniques indicated by FIG. 4A can allow utterances from different combinations of speakers to be applied in different training iterations. For example, in a first training iteration, the simulated enrollment utterances may have been spoken by a first speaker, and the simulated verification utterance also may have been spoken by the first speaker. In a second training iteration, the simulated enrollment utterances may have been spoken by a second speaker, and the simulated verification utterance may have been spoken by a third speaker. Then in a third training iteration, the simulated enrollment utterances may have been spoken by the first speaker, and the simulated verification utterance may have been spoken by the second speaker. In some implementations, a selection algorithm may be employed that does not randomly select groups of utterances 410*a-n*, but that instead determinatively selects groups of utterances 410*a-n* in a manner that creates different permutations or maximizes a number of permutations in the input samples 402 between speakers of the simulated verification and enrollment utterances. As a simple example, if three groups of utterances A, B, and C from three different training speakers were available in the utterance pool 408, then nine different input samples 402 may be generated for nine training iterations: (A, A), (A, B), (A, C), (B, A), (B, B), (B, C), (C, A), (C, B), and (C, C). Training iterations can also occur with these same pairings of groups, but with different utterances within the groups being selected.

One benefit of the training approach described herein, in contrast to other approaches that involve training a neural network to classify inputs as belonging to a particular speaker among a number of pre-selected speakers, is that a greater number and variety of speakers may be used to train the network. Additionally, there is no minimum number of training utterances that are required for each training speaker to ensure reliable training (other than the one or more utterances that are actually used for each training speaker), because the network is not trained to specific speakers, but is instead trained based on whether a given input sample 402 has matching speakers or non-matching speakers among the simulated verification and enrollment utterances.

FIG. 4B depicts a schematic diagram 400*b* of a shuffling technique for the selection of utterances for input samples during training of the neural network. As shown in the figure, the samples in a batch of training samples can all come from different pools to obtain better shuffling and diversity of utterances among the training samples in the batch. The shuffling technique may result in more robust and reliable training of the neural network.

Figure 5B:
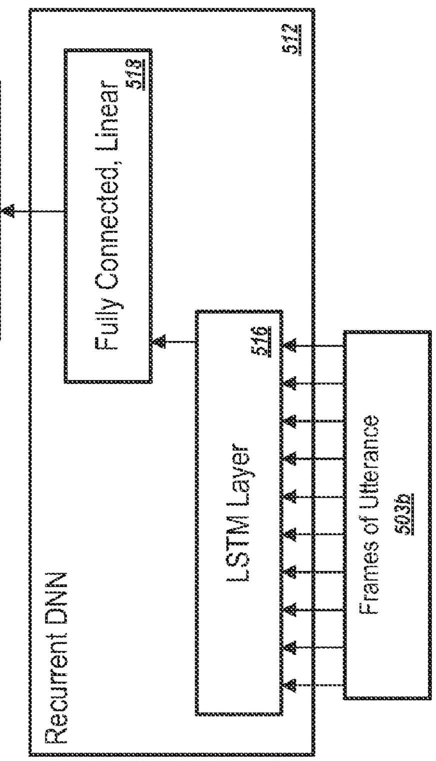
FIG. 5B depicts a block diagram of an example recurrent neural network having a long-short-term memory layer that is configured for use in a speaker verification model.
Figure 5A:
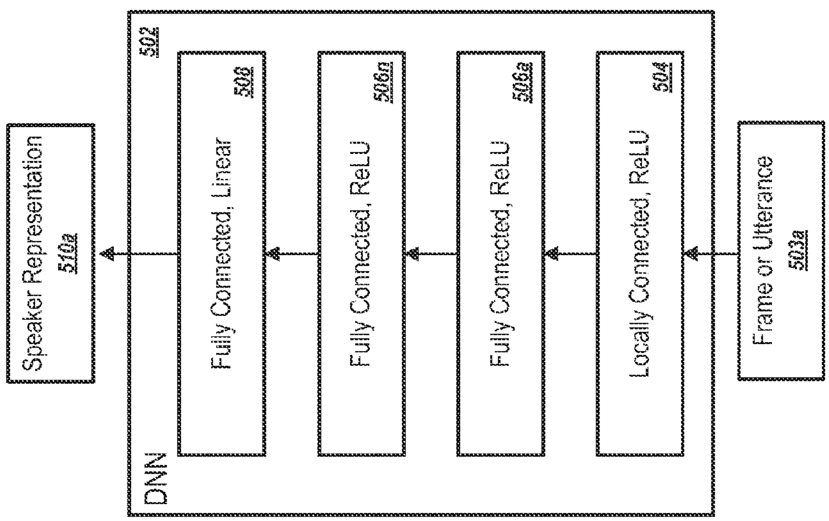
FIG. 5A depicts a block diagram of an example deep neural network configured to process data characterizing at least a portion of an utterance, and to generate a speaker representation based on the data characterizing the at least the portion of the utterance.

Turning to FIGS. 5A and 5B, block diagrams are shown of example neural networks 502, 512 that may be employed in a speaker verification model. In some implementations, either of the neural networks 502, 512 may be used to implement the techniques described with respect to FIGS. 1-4B and 6, including the training techniques described with respect to FIGS. 2-4B.

The architecture of the deep neural network 502 in FIG. 5A includes a locally connected layer 504, followed by one or more fully connected hidden layers 506*a-n*. The locally connected layer 504 and fully connected layers 506*a-n* may have rectified linear units (ReLUs). The last layer of the network 502 is a fully connected, linear layer 508, which outputs a speaker representation 510*a* based on the input utterance (or a frame of an utterance) 503*a*. The last layer 502 before the representation 510*a* is a linear layer in order to map the non-negative activations into the full space, and to determine projections in some implementations. The full space refers to the notion that ReLu activations can be functions such as y=max(x, 0). Therefore, the activations (y) that form the speaker representation may always be a positive vector. If such an activation function is changed by a linear activation function y=x, then the speaker representation can be made as a vector with potentially positive and negative values. The latter can be a more suitable representation of the speaker when it followed by a cosine distance comparison function, for example.

The configuration of the neural network 502 is generally capable of processing fixed length training utterances, or fixed number of frames of utterances. When the neural network 502 is trained and later used during runtime in the enrollment and verification phases, utterances may be cropped or padded, as appropriate, to ensure that the utterance has the fixed length required to be processed by the neural network 502. As a result, the neural network 502 can compute a speaker representation in a single pass, e.g., a single forward propagation through the deep neural network 502. This allows the speaker representation to be generated with lower latency than techniques that involve sequential processing of different portions of an utterance.

Next, the neural network 512 depicted in FIG. 5B is a recurrent neural network. Unlike the architecture of neural network 502, the neural network 512 is capable of processing variable length input utterances. For example, utterance 503*b* may be a training utterance, an enrollment utterance, or a verification utterance depending on the context in which the neural network 512 is being used. The utterance 503*b* may be segmented into a plurality of frames, which may have a fixed length. The number of frames inputted to the neural network 512 may be a function of the overall length of the utterance 503*b*. In other words, longer utterances may have more frames, and shorter utterances may have fewer frames. The frames of the utterance 503*b* are inputted to a long-short-term-memory (LSTM) layer 516. One or more additional hidden layers may follow the LSTM layer 516. The last layer of the network 512 is again a fully connected, linear layer 518. The fully connected, linear layer 518 may output a speaker representation 510*b* by mapping the non-negative activations into the full space, and determining projections in some cases. Because the neural network 512 is capable of handling variable length utterances, it may be well-suited for text-independent speaker verification in which the words or phrase of an utterance are not pre-defined and may vary among different utterances.

Although the neural networks 502 and 512 depicted in FIGS. 5A and 5B are shown as having particular configurations, the neural networks that may be employed with the techniques described herein are not limited by these examples. For example, the hidden topology of the neural networks may have different numbers and arrangements of layers, which may or may not include fully connected layers, locally connected layers, or any recurrent layers such as long short-term memory layers. The neural network may be a convolutional neural network in some implementations.

Figure 6:
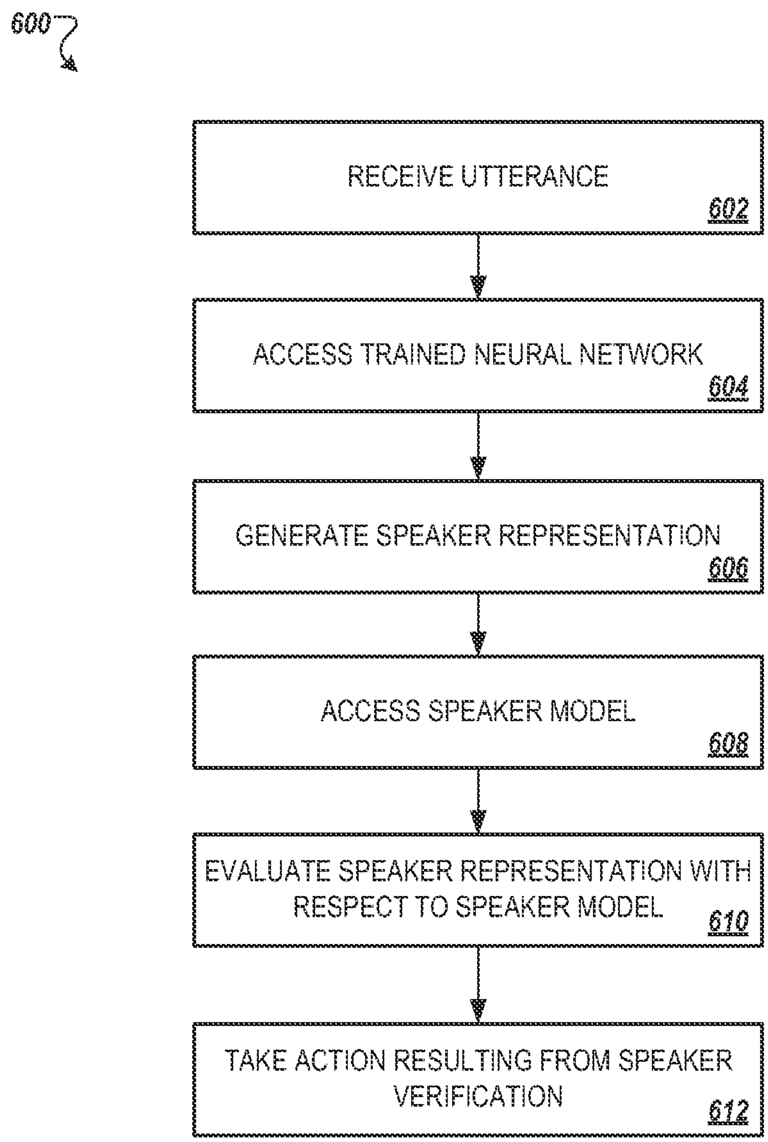
FIG. 6 depicts a flowchart of an example process for using a neural network on a computing device to verify the identity of a user based on characteristics of the user's voice determined from an utterance of the user.

FIG. 6 is a flowchart of an example process 600 for verifying an utterance using a speaker verification model and a neural network that has been trained according to the techniques described herein. The process 600 generally corresponds to the verification phase (stages E-G) depicted in FIG. 1. The neural network referred to in FIG. 6 may be trained according to the techniques described with respect to FIGS. 2-4B, and may have a structure like that shown in FIG. 5A or 5B, in some implementations.

At stage 602, an utterance can be received from a user of a computing device. For example, a user may wish to unlock his smartphone or perform some other function with a computing device. However, the smartphone may require the user to authenticate himself or herself before the phone will be unlocked, or before the desired function is performed. The authentication may be performed based on characteristics of the user's voice using a speaker verification model on the phone, in some implementations. The phone may prompt the user to speak a verification utterance, which may be received and recorded by the phone at stage 602.

At stage 604, the phone accesses a neural network to generate a speaker representation based on the received utterance. The neural network may be stored locally on the phone, or may be accessed on a remote computing system via an application programming interface (API), for example. The neural network may be trained according to the techniques described herein, and may have been trained based on samples of data that each include a simulated verification utterance and a plurality of simulated enrollment utterances. The neural network may be configured to process, in a single pass through the neural network, data that characterizes an entirety of an utterance. At stage 606, data that characterizes the received utterance is provided as input to the neural network. The neural network processes the input and generates a speaker representation that indicates distinctive characteristics of the user's voice.

At stage 608, a speaker model is accessed on the phone. The speaker model may indicate distinctive features of the voice of an enrolled user. In some implementations, the speaker model may be based on an average of multiple speaker representations generated by the neural network from data that characterizes respective utterances of the enrolled user. At stage 610, the speaker representation that was generated at stage 606 based on the verification utterance is compared to the speaker model, or is otherwise evaluated with respect to the speaker model. In some implementations, the comparison or other evaluation is performed by a speaker verification model on the user's phone. The speaker verification model may determine a distance or other measure of similarity between the speaker model and the speaker representation for the verification utterance. Based on the distance or other measure of similarity, the speaker verification model may authenticate the user if the user's voice is sufficiently similar to the enrolled user's voice. Otherwise, the speaker verification model may generate an indication that the user is not authenticated if a similarity of the user's voice does not meet at least a threshold similarity score with respect to the enrolled user's voice.

In some implementations, if the speaker verification model determines with sufficient confidence that the verification utterance was spoken by the enrolled speaker, the speaker model for the enrolled user may then be updated based on the verification utterance. Consider how the device may respond to the following three verification utterances, for example. The similarity score for the first of three verification utterances is below a first threshold value such that the speaker verification model rejects the identity of the user who spoke the first verification utterance (e.g., therefore the device may refuse to unlock in response to the first verification utterance). The similarity score for the second of the three verification utterances may meet the first threshold value such that the identity of the user who spoke the second verification utterance is accepted. However, the similarity score for the second verification utterance is not sufficiently high for the enrolled user's speaker model to be updated based on the second verification utterance. Finally, the similarity score for the third of the verification utterances satisfies the first threshold value, such that the identity of the user who spoke the third verification utterance is accepted (e.g., and a first set of actions such as unlocking a device may be performed), and also satisfies the higher, second threshold value, such that the speaker model for the enrolled user may be updated based on the third verification utterance. The speaker model may be updated by combining (e.g., averaging) the speaker representation generated by the neural network for the third verification utterance with other speaker representations from enrollment utterances of the user that were used to create the speaker model in the first instance.

At stage 612, the phone can then take an action based on whether or not the user is authenticated. For example, the phone may wake up or unlock in response to a determination that the user who provided the utterance is the enrolled user. But if the user who provided the utterance is determined to not be the enrolled user, or is not one of a plurality of enrolled users, then the phone may remain locked or may otherwise block performance of one or more functions that the user has selected to perform. In another application, the speaker verification techniques described herein may be employed on a user device (e.g., smartphone, notebook computer, wearable device) to reject speech input detected by the device from non-authorized users (e.g., users whose voices have not been enrolled with the device). For example, when the device is in an unlocked state, the device may listen for voice commands spoken by an authorized user of the device that indicate an action that the user wishes the device to perform (e.g. "Navigate to the football game" or "Play my music collection."). In some implementations, the device may only perform the requested action indicated by the voice command if it can be determined that the voice command was spoken by the authorized user. In this way, side speech from other, non-authorized users, for example, may be rejected.

Figure 7:
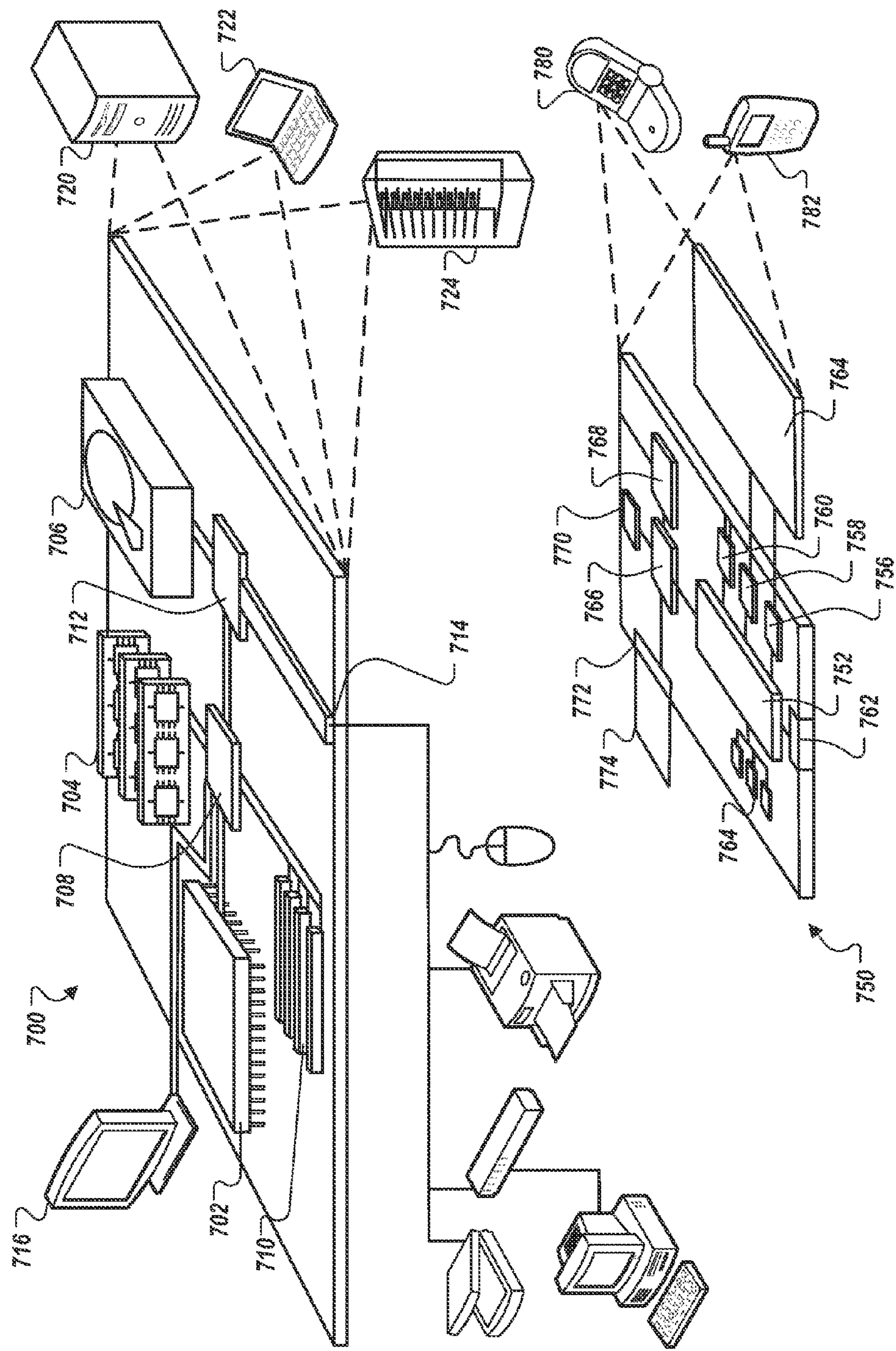
FIG. 7 depicts an example of a computing device and a mobile computing device that can be used in carrying out the computer-implemented methods and other techniques described herein.

FIG. 7 shows an example of a computing device 700 and a mobile computing device that can be used to implement the techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:

receiving, at a computing device, data that characterizes an utterance of a user of the computing device;

generating, at the computing device, a speaker representation for the utterance using a neural network on the computing device that was trained based on a plurality of training samples in a training procedure, wherein each training sample of the plurality of training samples includes (i) a first training input component that characterizes a first utterance, (ii) a second training input component that characterizes one or more second utterances, and (iii) a first classification for the training sample that indicates whether a speaker of the first utterance is the same or different from a speaker of the one or more second utterances, wherein the training procedure includes, for each training sample of the plurality of training samples:

(i) generating a second classification for the training sample that indicates whether the speaker of the first utterance is the same or different from a speaker of the one or more second utterances, the second classification based on an output that results from processing the first training input component and the second training input component with the neural network, and (ii) adjusting parameters of the neural network based on comparison of the first classification for the training sample and the second classification for the training sample;

accessing, at the computing device, a speaker model for an authorized user of the computing device;

evaluating, at the computing device, the speaker representation for the utterance with respect to the speaker model to determine whether the utterance was likely spoken by the authorized user of the computing device; and performing, at the computing device, an operation that is selected based on whether the utterance is determined to have been likely spoken by the authorized user of the computing device.

2. The computer-implemented method of claim 1, wherein each of the plurality of training samples was generated by selecting the first utterance and the one or more second utterances from groups of utterances that correspond to different speakers, such that each group of utterances consists only of utterances of the corresponding speaker for the respective group of utterances.

3. The computer-implemented method of claim 1, further comprising:

obtaining a set of utterances of the authorized user of the computing device;

inputting each utterance from the set of utterances into the neural network to generate a respective speaker representation for the utterance; and generating the speaker model for the authorized user of the computing device based on an average of the respective speaker representations for the utterances in the set of utterances of the authorized user.

4. The computer-implemented method of claim 1, wherein none of the plurality of training samples on which the neural network has been trained includes data that characterizes the utterance of the user of the computing device.

5. The computer-implemented method of claim 1, wherein generating, at the computing device, the speaker representation for the utterance comprises processing data that characterizes an entirety of the utterance with the neural network in a single pass through the neural network.

6. The computer-implemented method of claim 1, further comprising determining that the utterance was likely spoken by the authorized user of the computing device, wherein performing the operation that is selected based on whether the utterance is determined to have been likely spoken by the authorized user of the computing device comprises authenticating an identity of the user that submitted the utterance.

7. The computer-implemented method of claim 1, further comprising determining that the utterance was likely spoken by the authorized user of the computing device, wherein performing the operation that is selected based on whether the utterance is determined to have been likely spoken by the authorized user of the computing device comprises transitioning the computing device from a locked state to an unlocked state.

8. One or more non-transitory computer-readable media having instructions stored thereon that, when executed by one or more processors of a computing device, cause performance of operations comprising:

receiving, at the computing device, data that characterizes an utterance of a user of the computing device;

generating, at the computing device, a speaker representation for the utterance using a neural network on the computing device that was trained based on a plurality of training samples in a training procedure, wherein each training sample of the plurality of training samples includes (i) a first training input component that characterizes a first utterance, (ii) a second training input component that characterizes one or more second utterances, and (iii) a first classification for the training sample that indicates whether a speaker of the first utterance is the same or different from a speaker of the one or more second utterances, wherein the training procedure includes, for each training sample of the plurality of training samples:

(i) generating a second classification for the training sample that indicates whether the speaker of the first utterance is the same or different from a speaker of the one or more second utterances, the second classification based on an output that results from processing the first training input component and the second training input component with the neural network, and (ii) adjusting parameters of the neural network based on comparison of the first classification for the training sample and the second classification for the training sample;

accessing, at the computing device, a speaker model for an authorized user of the computing device;

evaluating, at the computing device, the speaker representation for the utterance with respect to the speaker model to determine whether the utterance was likely spoken by the authorized user of the computing device; and performing, at the computing device, an operation that is selected based on whether the utterance is determined to have been likely spoken by the authorized user of the computing device.

9. The non-transitory computer-readable media of claim 8, wherein each of the plurality of training samples was generated by selecting the first utterance and the one or more second utterances from groups of utterances that correspond to different speakers, such that each group of utterances consists only of utterances of the corresponding speaker for the respective group of utterances.

10. The non-transitory computer-readable media of claim 8, wherein the operations further comprise:

obtaining a set of utterances of the authorized user of the computing device;

inputting each utterance from the set of utterances into the neural network to generate a respective speaker representation for the utterance; and generating the speaker model for the authorized user of the computing device based on an average of the respective speaker representations for the utterances in the set of utterances of the authorized user.

11. The non-transitory computer-readable media of claim 8, wherein none of the plurality of training samples on which the neural network has been trained includes data that characterizes the utterance of the user of the computing device.

12. The non-transitory computer-readable media of claim 8, wherein generating, at the computing device, the speaker representation for the utterance comprises processing data that characterizes an entirety of the utterance with the neural network in a single pass through the neural network.

13. A computing device, comprising:

one or more processors; and one or more non-transitory computer-readable media having instructions stored thereon that, when executed by the one or more processors, cause performance of operations comprising:

receiving, at the computing device, data that characterizes an utterance of a user of the computing device;

generating, at the computing device, a speaker representation for the utterance using a neural network on the computing device that was trained based on a plurality of training samples in a training procedure, wherein each training sample of the plurality of training samples includes (i) a first training input component that characterizes a first utterance, (ii) a second training input component that characterizes one or more second utterances, and (iii) a first classification for the training sample that indicates whether a speaker of the first utterance is the same or different from a speaker of the one or more second utterances, wherein the training procedure includes, for each training sample of the plurality of training samples:

(i) generating a second classification for the training sample that indicates whether the speaker of the first utterance is the same or different from a speaker of the one or more second utterances, the second classification based on an output that results from processing the first training input component and the second training input component with the neural network, and (ii) adjusting parameters of the neural network based on comparison of the first classification for the training sample and the second classification for the training sample;

accessing, at the computing device, a speaker model for an authorized user of the computing device;

evaluating, at the computing device, the speaker representation for the utterance with respect to the speaker model to determine whether the utterance was likely spoken by the authorized user of the computing device; and performing, at the computing device, an operation that is selected based on whether the utterance is determined to have been likely spoken by the authorized user of the computing device.

14. The computing device of claim 13, wherein each of the plurality of training samples was generated by selecting the first utterance and the one or more second utterances from groups of utterances that correspond to different speakers, such that each group of utterances consists only of utterances of the corresponding speaker for the respective group of utterances.

15. The computing device of claim 13, wherein the operations further comprise:

obtaining a set of utterances of the authorized user of the computing device;

inputting each utterance from the set of utterances into the neural network to generate a respective speaker representation for the utterance; and generating the speaker model for the authorized user of the computing device based on an average of the respective speaker representations for the utterances in the set of utterances of the authorized user.

16. The computing device of claim 13, wherein none of the plurality of training samples on which the neural network has been trained includes data that characterizes the utterance of the user of the computing device.

17. The computing device of claim 13, wherein generating, at the computing device, the speaker representation for the utterance comprises processing data that characterizes an entirety of the utterance with the neural network in a single pass through the neural network.

* * * * *